Patented Dec. 20, 1938

2,140,800

UNITED STATES PATENT OFFICE 2,140,800

TREATMENT OF SUBSTANCES CONTAINING TANTALUM AND/OR NIOBIUM

Joseph Pierre Leemans, Hoboken, near Antwerp, Belgium, assignor to Société Générale Métallurgique de Hoboken, Hoboken, near Antwerp, Belgium, a limited company of Belgium No Drawing. Original application April 26, 1937, Serial No. 139,018. Divided and this application November 27, 1937, Serial No. 176,919. In Great Britain April 28, 1936

1 Claim. (Cl. 75—21)

This application is a division of my application Ser. No. 139,018 filed on the 26th of April 1937 and patented under No. 2,131,350.

This invention relates to a process of treatment of substances (ores of tantalum or niobium, metallurgical by-products or the like) containing tantalum and/or niobium (which may be in oxidized form) and in the presence of at least one of the following metals: tin, manganese, iron.

The invention consists broadly in removing those of the elements tin, manganese, iron which are present in the substance treated, prior to the extraction of tantalum and/or niobium.

The removal of Sn and/or Mn and/or Fe may be effected by a reducing operation in the presence of a solid reducing agent (charcoal for instance), or of a reducing gas such as hydrogen, water gas, carbon monoxide, etc.

The material treated may be previously crushed, or put into pastille form, or it may be subjected to any other convenient physical treatment.

The mixture of raw material and reducing agent may be placed in a receptacle (furnace for instance) capable of being closed with a tight joint fit and the atmosphere of which may be regulated at will, as to its nature, or as to pressure.

The mixture is brought to the required temperature, which is to be determined by experiment for each particular case, according to the composition of the mixture treated, and should be such that any melting of the charge should be avoided. In certain cases a temperature comprised between 800° C. and 1200° C. has been found advantageous.

After the reducing operation, and if necessary after being crushed, the treated product may be subjected to leaching so as to dissolve the reduced Sn and/or Mn and/or Fe. The solution of Sn and/or Mn and/or Fe may be separated from the residue by any known means. The tantalum and/or niobium are then extracted by any known means from the residue. This extraction is greatly facilitated by the absence of Sn, Mn, Fe.

For instance the residue may be reduced in an electric furnace in the presence of Al and/or Ca and/or Mg.

I claim:

A process of treating substances containing at least one of the elements tantalum and niobium in oxide form and also tin and iron, which comprises reducing substantially the entire amount of tin and part only of the iron which is present by means of carbon alone at a temperature from 800 to 1200° C., whilst avoiding the melting of the charge and the reduction of the tantalum and niobium oxides, leaching the treated product to dissolve the reduced tin and iron, thus leaving a residue containing an element of the group consisting of tantalum and niobium with iron, separating the solution of tin and iron from the residue, and treating the latter residue by a reducing operation in the presence of at least one of the elements calcium, magnesium, silicon with a view to recovering the tantalum and niobium as a ferro-alloy.

JOSEPH PIERRE LEEMANS.